United States Patent
Suwabe

(10) Patent No.: US 9,772,905 B2
(45) Date of Patent: Sep. 26, 2017

(54) UPDATING CONTROL FIRMWARE OF INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Takeshi Suwabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 14/840,246

(22) Filed: Aug. 31, 2015

(65) Prior Publication Data

US 2016/0062838 A1 Mar. 3, 2016

(30) Foreign Application Priority Data

Sep. 3, 2014 (JP) ................................. 2014-179517

(51) Int. Cl.
*G06F 11/00* (2006.01)
*G06F 11/14* (2006.01)

(52) U.S. Cl.
CPC ...... *G06F 11/1438* (2013.01); *G06F 11/1433* (2013.01); *G06F 2201/805* (2013.01)

(58) Field of Classification Search
CPC ............. G06F 11/1438; G06F 11/1433; G06F 2201/805; G06F 8/65; G06F 8/67
See application file for complete search history.

(56) References Cited

U.S. PATENT DOCUMENTS

| | | | |
|---|---|---|---|
| 9,563,497 B2* | 2/2017 | Dasari | G06F 11/0793 |
| 2004/0103340 A1* | 5/2004 | Sundareson | G06F 11/1433 714/6.3 |
| 2004/0123282 A1* | 6/2004 | Rao | G06F 8/665 717/168 |
| 2010/0122246 A1* | 5/2010 | Gesquiere | G06F 8/65 717/173 |
| 2010/0199078 A1* | 8/2010 | Shih | G06F 8/65 713/2 |
| 2011/0131563 A1* | 6/2011 | Ohama | G06F 8/65 717/168 |
| 2014/0173328 A1* | 6/2014 | Dasari | G06F 11/0793 714/2 |
| 2015/0020060 A1* | 1/2015 | Bandakka | G06F 8/665 717/171 |
| 2015/0052511 A1* | 2/2015 | Kiaie | G06F 8/65 717/169 |

(Continued)

FOREIGN PATENT DOCUMENTS

JP 2011-128702 A 6/2011

*Primary Examiner* — Marc Duncan
(74) *Attorney, Agent, or Firm* — Carter, DeLuca, Farrell & Schmidt, LLP

(57) ABSTRACT

In an information processing apparatus, any piece of firmware among pieces of firmware is used to activate the information processing apparatus, a piece of firmware that is different from the piece of firmware used in activation of the information processing apparatus is updated, the image processing apparatus is restarted with a piece of firmware that is different from the currently activated firmware, and the piece of firmware that is different from the piece of firmware used in activation is updated.

11 Claims, 9 Drawing Sheets

(56) References Cited

U.S. PATENT DOCUMENTS

2015/0169313 A1\* 6/2015 Katsura .................. G06F 11/00
717/170
2016/0170736 A1\* 6/2016 Landry .................. G06F 8/665
717/168

\* cited by examiner

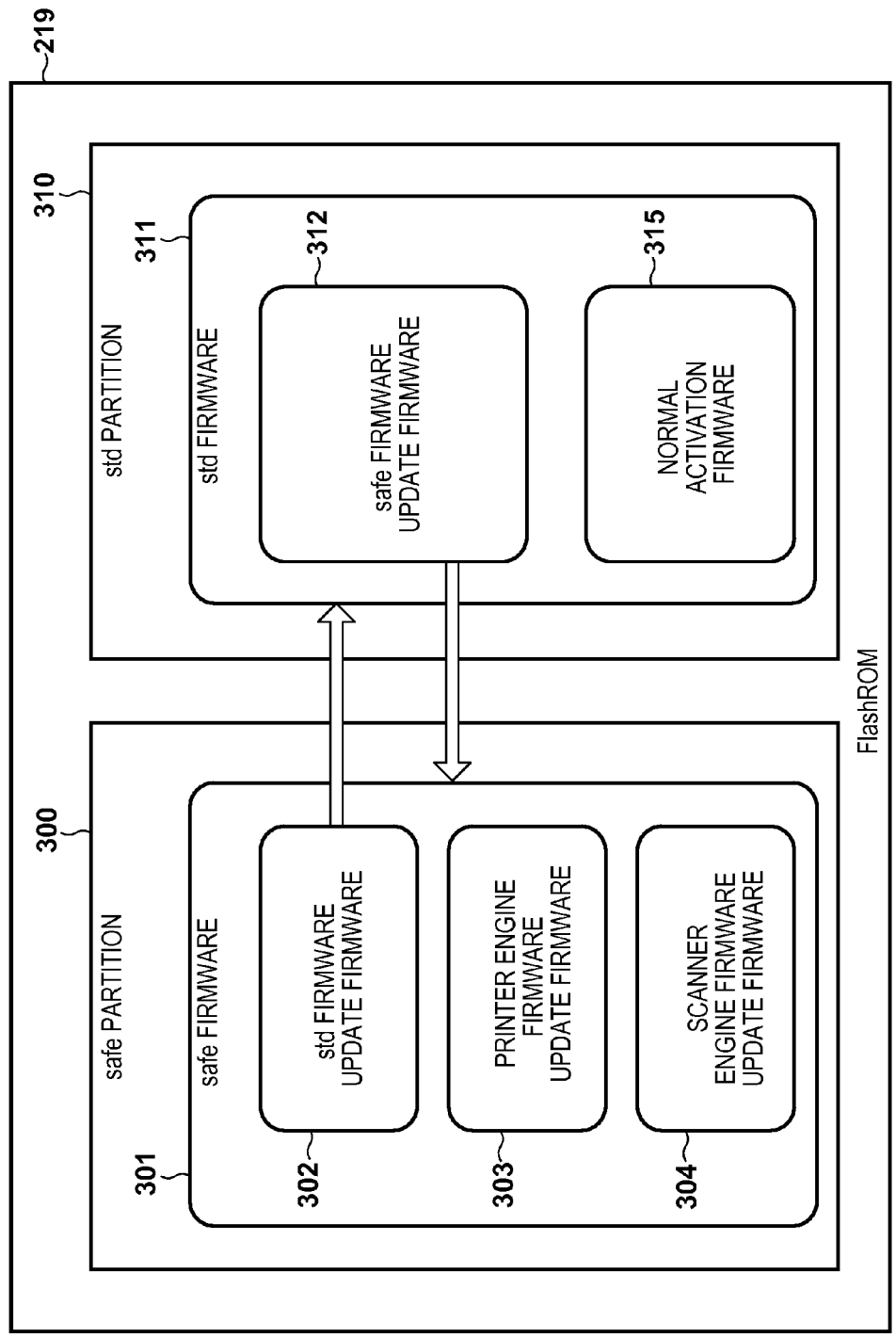

FIG. 4

```
------------------------------------------
FirmDownload      100%
std-firm          100%
printer-firm      100% safe-firm         50%
------------------------------------------
Safe Firm update is stopped by error.
```
~601

```
------------------------------------------

PLEASE REATTACH THE APPARATUS TO POWER SOURCE

PLEASE INFORM SERVICE REPRESENTATIVE OF
FOLLOWING CODE IF IRREGULAR OPERATIONS OCCUR EVEN
AFTER PERFORMING ABOVE OPERATION.

E0000000-0000 ~603

------------------------------------------
```
~602

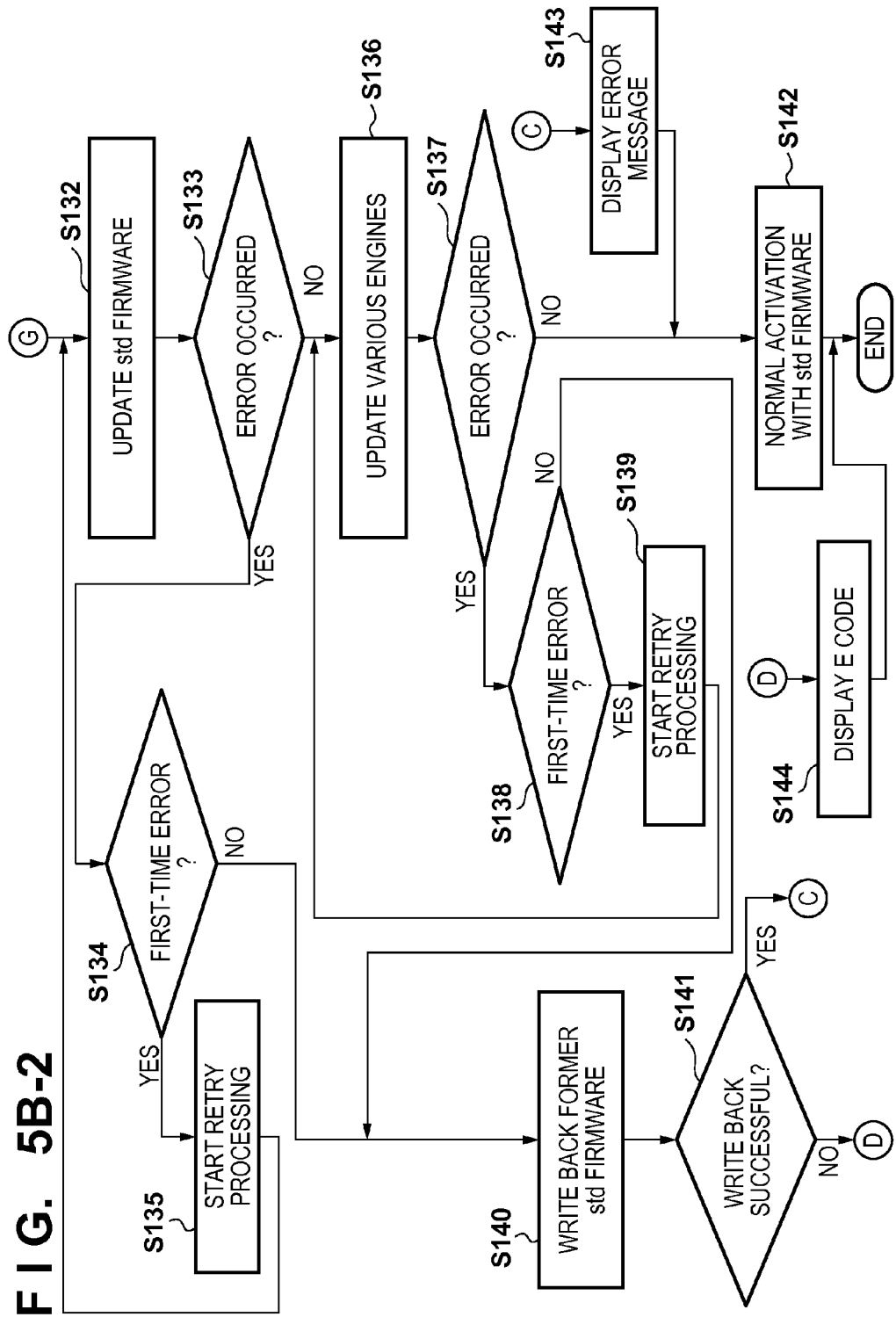

UPDATING CONTROL FIRMWARE OF INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus and a method of controlling the same, and a storage medium.

Description of the Related Art

Update firmware for updating normal firmware (software) exists in firmware updates (software updates), and update processing is executed in the update firmware. Below, firmware and software are called "firmware", and firmware updates and software updates are called "firmware updates".

Errors can occur in the processing step of downloading and rendering firmware and the processing step of rewriting firmware (actual update processing) during update processing. For example, there are errors such as not being able to correctly receive data while downloading firmware, and not being able to properly write at the place of rendering. A technique in which a restoration operation is performed when updating fails is proposed in Japanese Patent Laid-Open No. 2011-128702. In the following, to simplify the description, update firmware is referred to as safe firmware and normal firmware is referred to as std firmware.

However, the above conventional technology has the problems described below. For example, in the above conventional technology, in the case in which an error has been detected during an update, control is performed for automatic restoration to a previous version or to search for another version and update to a separate version. However, in the above conventional technology, although device operations are guaranteed, it is not possible to ultimately update to the desired firmware.

SUMMARY OF THE INVENTION

The present invention enables realization of a mechanism for executing a desired update while also avoiding errors, even in the case in which an error has occurred during an update.

One aspect of the present invention provides an information processing apparatus including a plurality of pieces of firmware, comprising: an activation unit configured to activate the information processing apparatus using any piece of firmware among the plurality of pieces of firmware; an update unit configured to update a piece of firmware that is different from the piece of firmware used by the activation unit to activate the information processing apparatus; and a control unit configured to, if an error occurs while the piece of firmware is being updated, cause the activation unit to restart the information processing apparatus using a piece of firmware that is different from a piece of firmware that is currently activated, and cause the update unit to update a piece of firmware that is different from the piece of firmware that was used in restarting.

Another aspect of the present invention provides a method of controlling an information processing apparatus that includes a plurality of pieces of firmware, comprising: activating the information processing apparatus using any piece of firmware among the plurality of pieces of firmware; updating a piece of firmware that is different from the piece of firmware used to activate the information processing apparatus in the activating step; and restarting if an error occurs while the piece of firmware is being updated, the image processing apparatus in the activating step using a piece of firmware that is different from a piece of firmware that is currently activated, and updating a piece of firmware that is different from the piece of firmware that was used in restarting.

Another aspect of the present invention provides a non-transitory computer-readable storage medium storing a computer program for causing a computer to execute each step in a method for controlling an image processing apparatus that includes a plurality of pieces of firmware, the method comprising: activating the information processing apparatus using any piece of firmware among the plurality of pieces of firmware; updating a piece of firmware that is different from the piece of firmware used to activate the information processing apparatus in the activating step; and restarting if an error occurs while the piece of firmware is being updated, the image processing apparatus in the activating step using a piece of firmware that is different from a piece of firmware that is currently activated, and updating a piece of firmware that is different from the piece of firmware that was used in restarting.

Further features of the present invention will be apparent from the following description of exemplary embodiments with reference to the attached drawings.

BRIEF DESCRIPTION OF THE DRAWINGS

FIG. 2 is a diagram showing a configuration of an update system in the information processing apparatus 100 centered on a flash ROM 219 according to an embodiment.

FIG. 4 is a diagram showing a screen that is displayed on an operation unit 220 in a case in which an error occurred according to an embodiment.

FIGS. 5A-1 and 5A-2 are flowcharts showing a processing flow in the update system of the information processing apparatus 100.

FIGS. 5B-1 and 5B-2 are flowcharts showing a processing flow in the update system of the information processing apparatus 100.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Information Processing Apparatus

Figure 1:
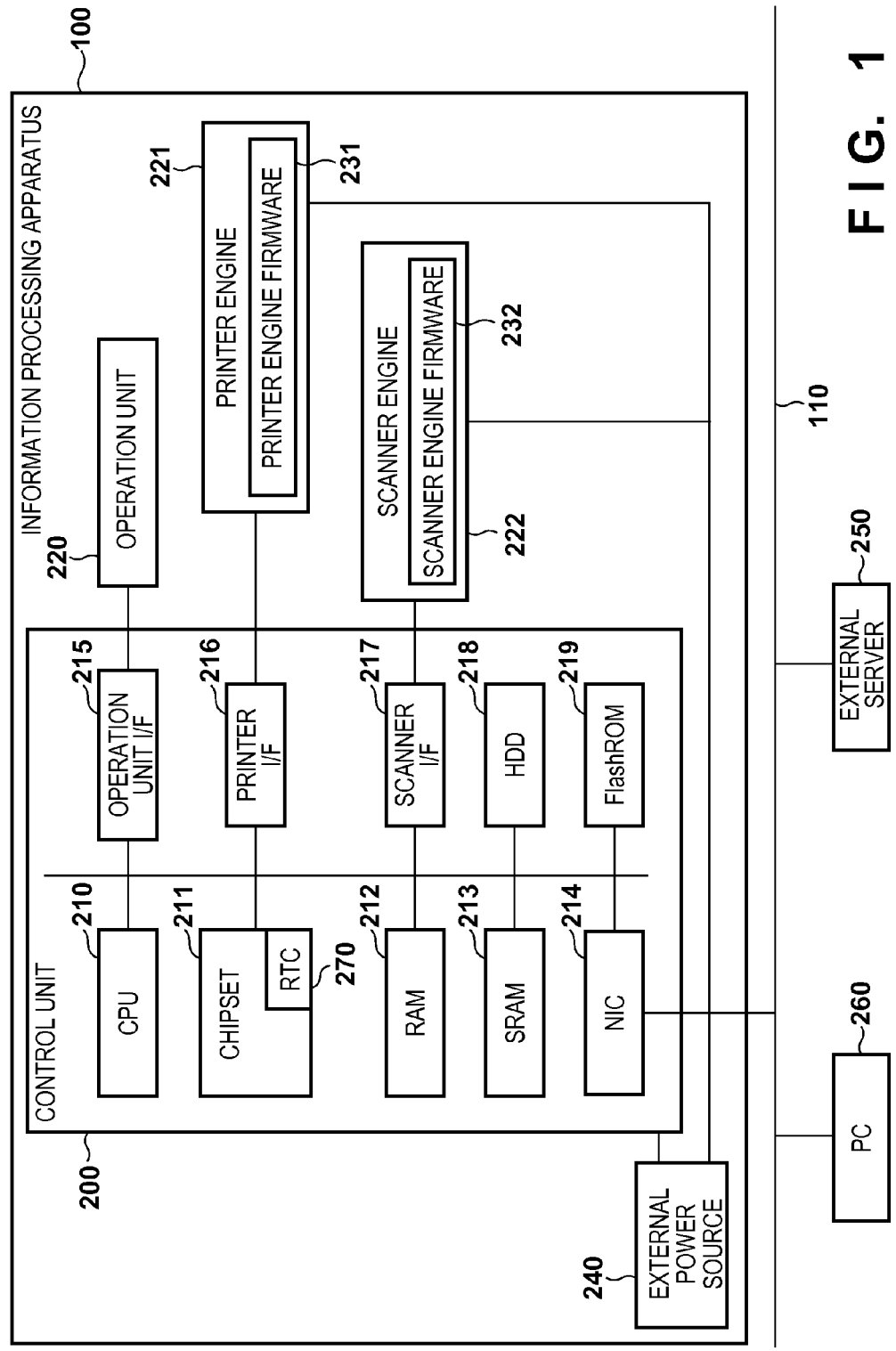
FIG. 1 is a diagram showing an example of a configuration of an information processing apparatus 100 according to an embodiment.

First, the configuration of an information processing apparatus 100 according to an embodiment will be described with reference to FIG. 1. As shown in FIG. 1, the information processing apparatus 100 is connected to a PC 260 and an external server 250 via a LAN 110. The information processing apparatus 100 includes a control unit 200, an operation unit 220, a printer engine 221, a scanner engine 222, and an external power source 240. Furthermore, the control unit 200 includes a CPU 210, a chipset 211, a RAM 212, an SRAM 213, an NIC 214, an operation unit I/F 215, a printer I/F 216, a scanner I/F 217, an HDD 218, and a flash ROM 219.

The control unit 200 integrally controls the operations of the overall information processing apparatus 100. The CPU 210 reads a control program, which is stored in the flash ROM 219, to the RAM 212 and executes various types of control processes such as reading control, printing control, and firmware update control. Also, the flash ROM 219 is used as a firmware update file storage area, a work area, and a user data area. The RAM 212 is used as the main memory of the CPU 210 and as a temporary storage area such as a work area. The SRAM 213 is a non-volatile memory that stores setting values, image adjustment values, and the like that are required by the information processing apparatus 100, and is configured in such a way that data does not disappear even if the power source is reset. The HDD 218 stores image data, user data, and the like.

The operation unit I/F 215 connects the operation unit 220 and the control unit 200. A liquid crystal display unit that has a touch panel function, a keyboard, and the like are included in the operation unit 220. The printer I/F 216 connects the printer engine 221 and the control unit 200. A printer engine firmware 231 is stored in a ROM included in the printer engine 221. Image data that is to be printed by the printer engine 221 is transferred from the control unit 200 to the printer engine 221 via the printer I/F 216, and printed onto a recording medium in the printer engine 221.

The scanner I/F 217 connects the scanner engine 222 and the control unit 200. A scanner engine firmware 232 is stored in a ROM included in the scanner engine 222. The scanner engine 222 reads an image on an original and generates image data, which is input to the control unit 200 via the scanner I/F 217.

The network I/F card (NIC) 214 connects the control unit 200 to the LAN 110. The NIC 214 transmits image data and information to an external apparatus (e.g., the external server 250 or the PC 260) on the LAN 110 and conversely receives pieces of update firmware and various types of information.

The external server 250 may be connected to the information processing apparatus 100 via the Internet. Also, operation of the information processing apparatus 100 can be performed from a web browser included in the PC 260. The chipset 211 indicates a series of related integrated circuits. An RTC 270 is a real time clock (RealTimeClock) and is a clock-dedicated chip. Even if the external power source 240 is not connected, the RTC 270 receives a power supply from an internal battery, and thus can operate during sleep mode. Accordingly, waking up from sleep mode can be realized in a state in which power is to be supplied to a portion of the chipset 211. Conversely, in the case of a shutdown state in which there is no power supply for the chipset 211, the RTC 270 cannot operate.

Configuration of Flash ROM

Figures 1, 5A:
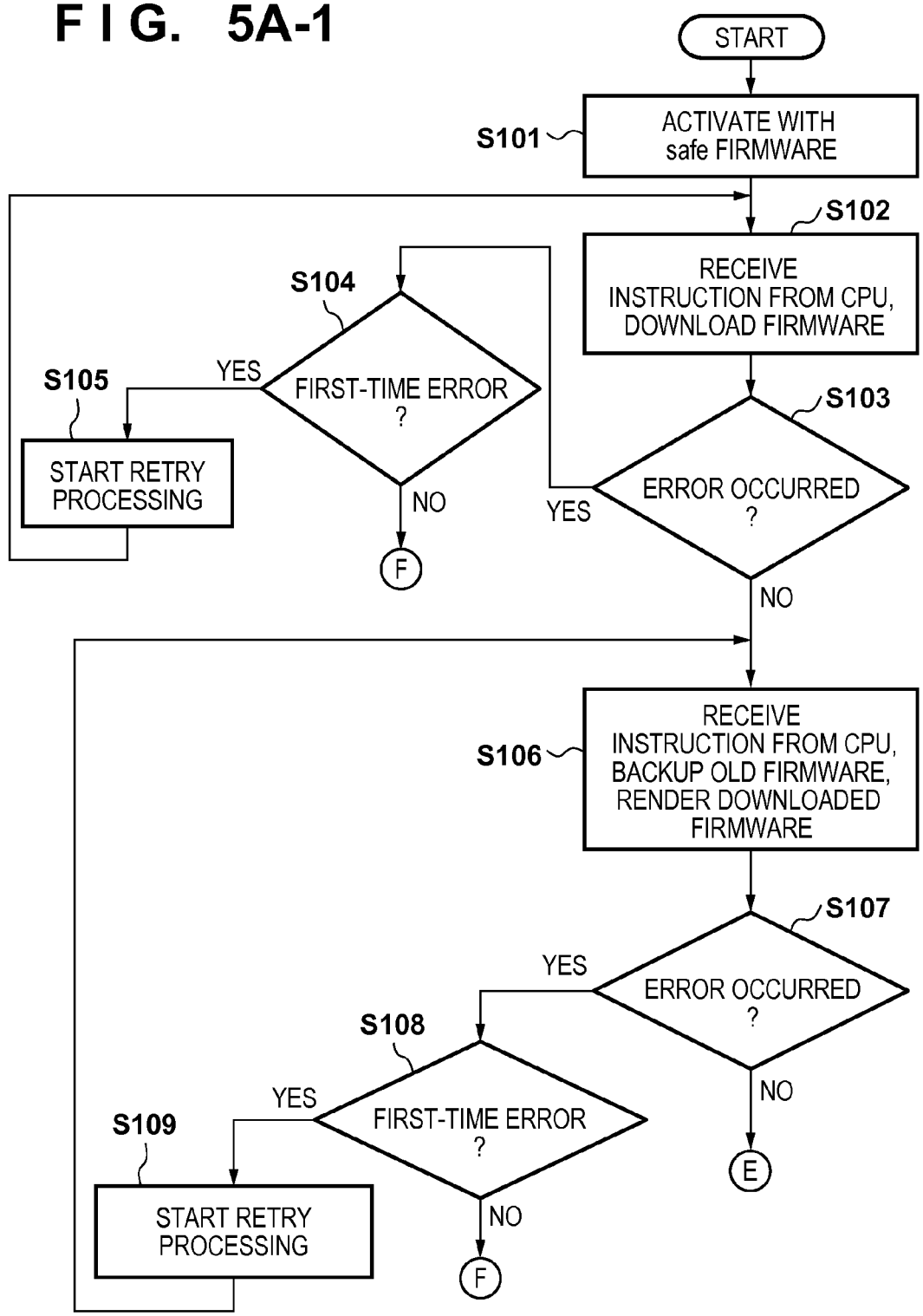
Figures 2, 5A:
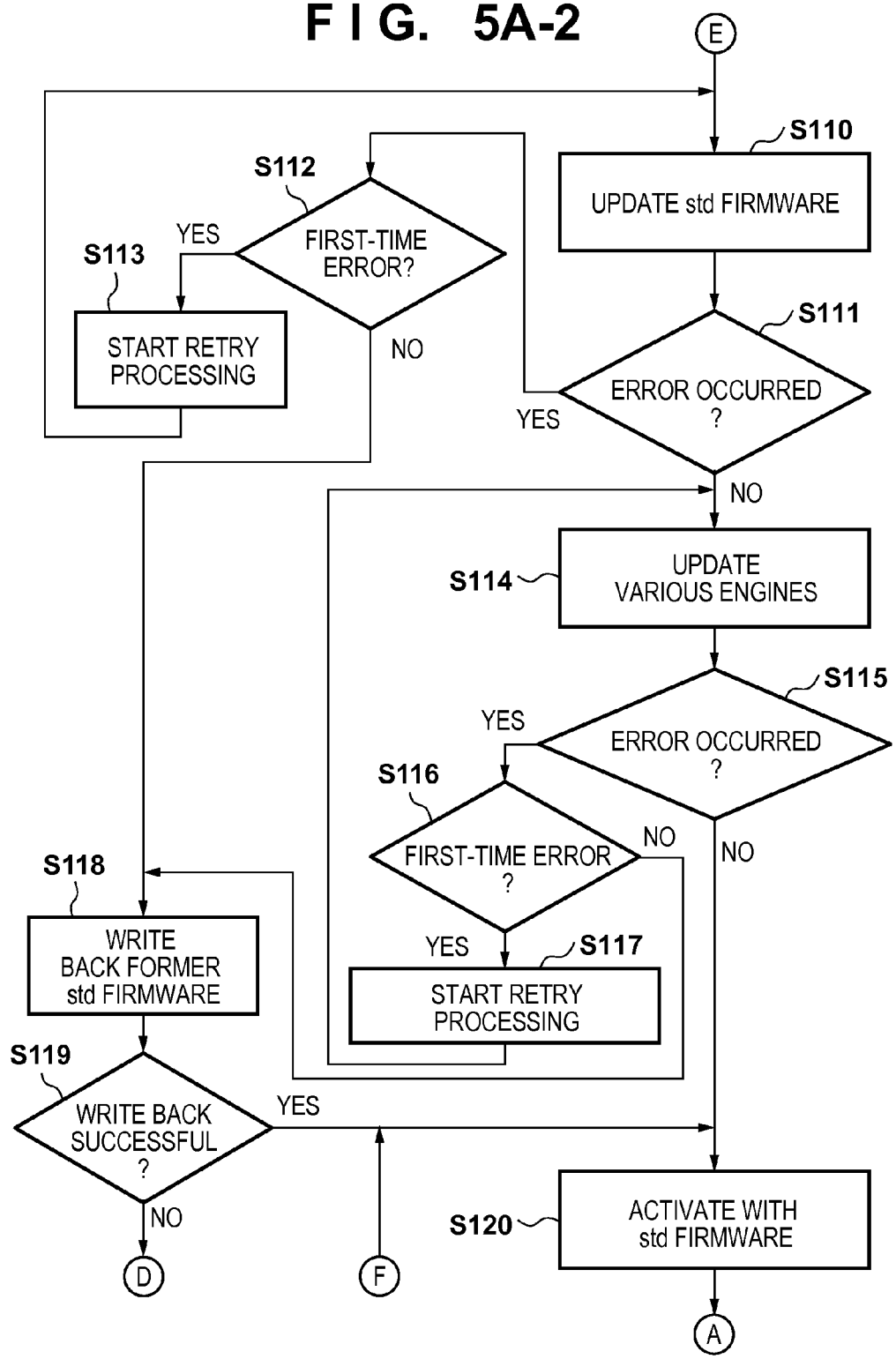

Next, the configuration of the flash ROM 219 will be described with reference to FIG. 2. 300 and 310 indicate partitions configured in the flash ROM 219. 300 is a safe partition that includes a safe firmware 301, which is update firmware, and 310 is an std partition that includes an std firmware (first firmware) 311, which is firmware used for normal activation.

The safe firmware 301 (second firmware) is configured to include an std firmware update firmware 302, a printer engine firm firmware update firmware 303, and a scanner engine firmware update firmware 304. The std firmware update firmware 302 is used when updating the std firmware 311. The printer engine firmware update firmware 303 includes a function for updating the printer engine firmware 231 shown in FIG. 1. Similarly, the scanner engine firmware update firmware 304 includes a function for updating the scanner engine firmware 232 in FIG. 1.

The above also similarly applies to the case where a configuration other than a scanner engine or a printer engine, such as a finisher, is connected as the information processing apparatus 100. The std firmware 311 is constituted by a safe firmware update firmware 312 and a normal activation firmware 315. The safe firmware update firmware 312 includes a function for updating the safe firmware 301. The normal activation firmware 315 is firmware that performs general operations, such as copying and printing, as a multi-function peripheral. The activation mode according to the present invention indicates either activation with the safe firmware 301 or activation with the std firmware 311, each of which include a function for switching the activation mode.

Processing Steps

Next, the updating firmware processing step and the error processing step are described with reference to FIGS. 3A and 3B. First, in processing step 501, the safe firmware 301 is used to activate the information processing apparatus 100. According to the present embodiment, if an error is detected while firmware is being updated, retry processing is executed, and in the case in which the error is not resolved even if retry processing has been performed more than a predetermined number of times, control is performed to switch the piece of update target firmware. Here, errors that occur while receiving the piece of update target firmware may be included as an error detected while firmware is updating. Also, errors that may be included are errors that occur when the received piece of update target firmware is rendered to the memory and errors that occur when the current firmware of the information processing apparatus 100 that corresponds to the piece of update target firmware is backed up. Furthermore, errors that occur when a piece of firmware is updated may be included.

Processing step 401 is a download processing step. For example, firmware for updating is downloaded (received) from the external server 250 shown in FIG. 1. Here, in the case in which downloading fails, retry processing is performed once. In the present embodiment the number of retries is described as being one, but the present invention is not limited to this, and the number of retires may be set to a number greater than one.

Processing step 402 is a step for backing up the operating std firmware 311 and rendering the downloaded firmware. The downloaded firmware has undergone processing such as normal encryption and obfuscation, and therefore processing such as decryption is performed to make updates possible, and the downloaded firmware is rendered to the flash ROM 219. Here, in the case in which backup or render processing fails, retry processing is performed once. Conceivable cases of failure include, for example, exceeding the capacity of the flash ROM 219 for rendering, writing failures, and decryption failures.

Processing step 403 is a step for updating the std firmware 311, and performing processing that actually writes the firmware that was rendered in processing step 402. Here as well, in the case of a failure occurring, retry processing is performed once. In the case of failure, there is a possibility that the std firmware 311 is in a damaged state, and therefore the former std firmware 311, which was backed up in processing step 402, is written back in processing step 405 in order to operate with the previously operating firmware.

Processing step 404 is a step for updating the engine firmware, and here as well, in the case of a failure, retry processing is performed once, but in the case of a failure, there is a possibility that the combination with the std firmware 311 is irregular, and therefore write-back is performed in processing step 405. Thereafter, activation is performed with the std firmware 311 in processing step 502. Also, if a retry failure occurs in processing step 401, 402, 403, or 404, activation is performed with the std firmware 311. This is because by performing the processing of the present invention for updating the safe firmware 301 even if an error occurs one time, the processing for updating the std firmware 311 becomes recovery processing for operating correctly.

Similarly, processing step 406 is a step for backing up the safe firmware 301 and rendering the downloaded firmware, processing step 407 is a step for updating the safe firmware 301, and in the case of failure, retry processing is performed. In the case in which writing back of the former std firmware 311 failed in processing step 405 or the writing back of the former safe firmware 301 failed in processing step 408, an error code as shown in 602 of FIG. 4 is displayed on the operation unit 220 in processing step 411 in order to avoid entering a state of activation failure or the like.

Conversely, in other cases, operation with the previously operating firmware is possible, and therefore only an error message as shown in 601 of FIG. 4 is displayed on the operation unit 220 in processing step 409, and activation with the std firmware 311 is performed in processing step 410. Processing steps 412, 413, and 414 are similar to 402, 403, and 404, but here, in processing step 406 and processing step 407, the safe firmware 301 has been changed to a new version, and therefore there is a low possibility of an error such as the one that occurred in processing steps 402, 403, and 404 occurring. Note that processes in processing step 415 such as retry processing and writing back the former std firmware 311 are similarly performed.

In the case in which the write back of the former safe firmware 301 in processing step 415 failed, an error code as shown in 602 of FIG. 4 is displayed on the operation unit 220 in processing step 418 in order to avoid entering a state of activation failure or the like. Conversely, in other cases, operation with the previously operating firmware is possible, and therefore only an error message such as the one shown in 601 of FIG. 4 is displayed in processing step 416, and the activation with the std firmware 311 is performed in processing step 417.

Example of Screen at Time of Error Occurrence

Figure 3A:
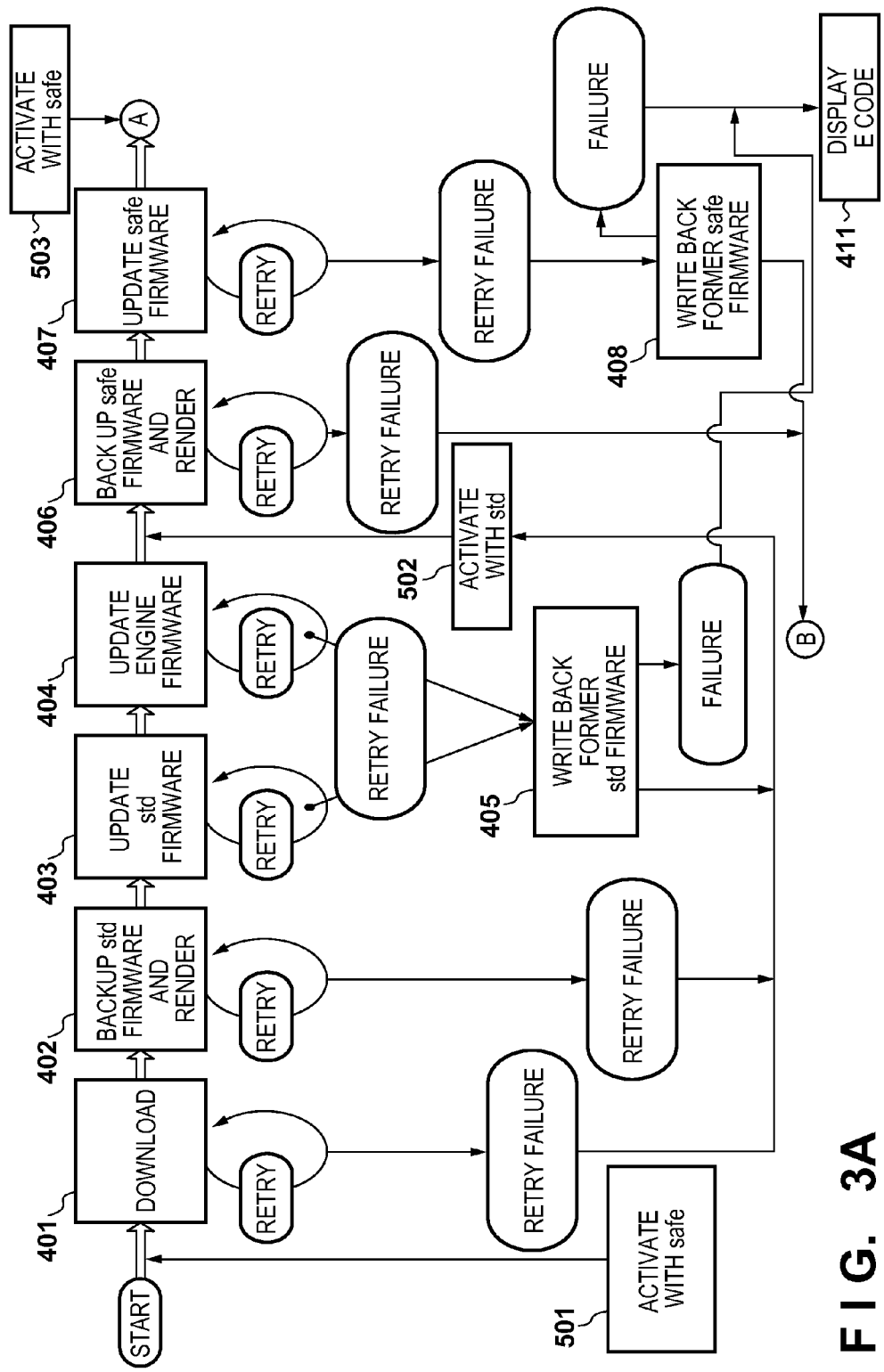
FIGS. 3A and 3B are schematic diagrams of an update step and an error processing step according to an embodiment.
Figure 3B:
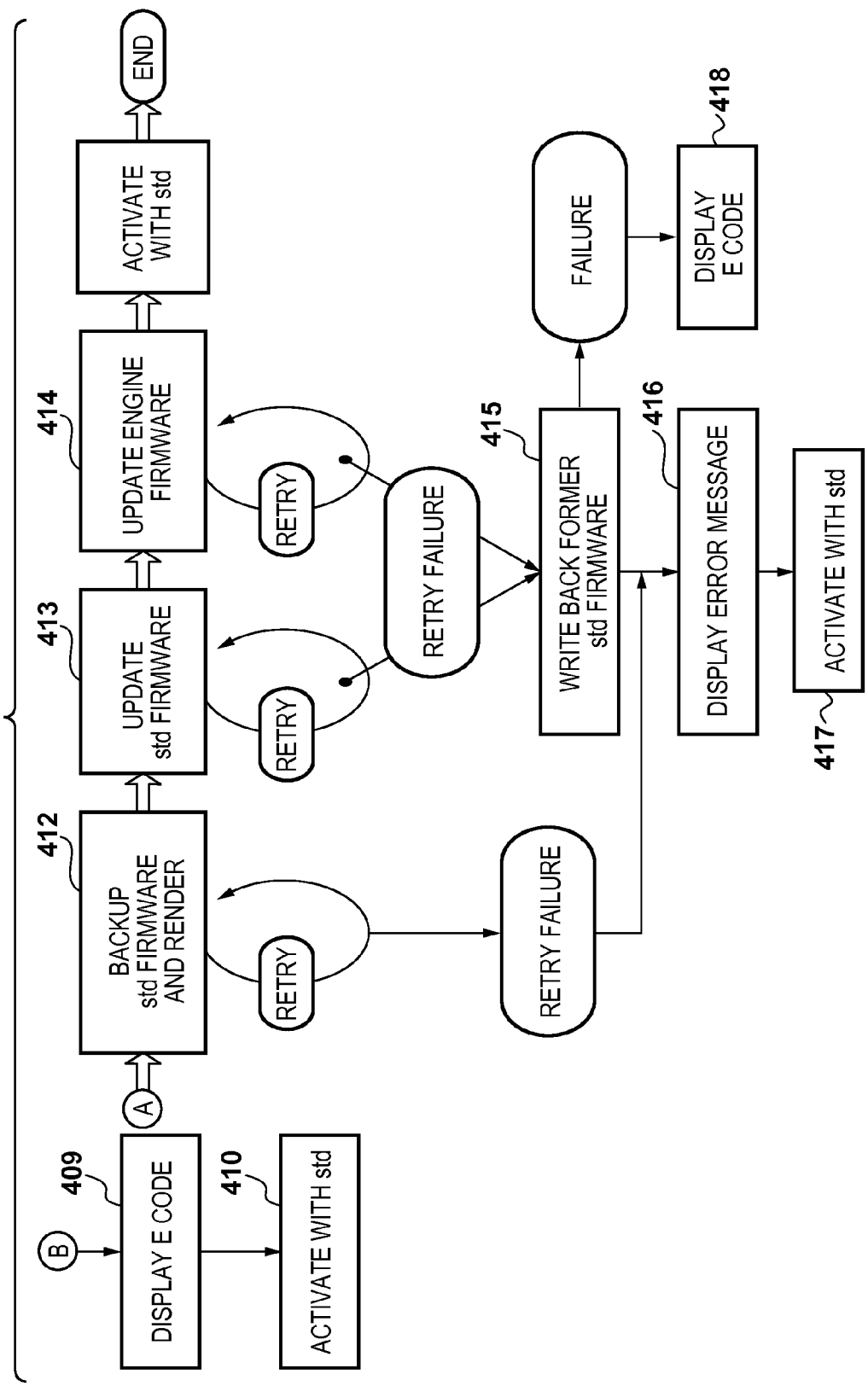

Next, an example of a screen with an error message/error code display that is displayed on the operation unit 220 in the case in which an error occurs will be described with reference to FIG. 4. 601 is the screen that is displayed at the time when the former firmware is written back in the case in which an error occurred during an update and retry processing is not successful, as shown in FIGS. 3A and 3B. For example, 601 is displayed on the operation unit 220 in the case in which the updating of the safe firmware 301 in processing step 406 failed and the retry processing also failed. Here, in 601, the reason an error code is not displayed (processing such as to call a serviceman is not performed) is because despite the desired update not being possible, at least operations prior to updating are possible. Conversely, in the case in which even write back processing of the former firmware also fails, the error code 603 similar to 602 is displayed on the operation unit 220 in order to avoid entering a state of activation failure or the like and negatively impacting the user.

Processing Procedure

Next, the procedure of a series of processes will be described with reference to FIG. 5A and FIG. 5B. The following processes that are described are realized by the CPU 210 reading out a control program stored in the HDD 218 or the flash ROM 219 to the RAM 212 and executing it. Note that below, as a normal processing route, first the information processing apparatus 100 is activated with the safe firmware 301 and the std firmware 311 is updated, and thereafter the information processing apparatus 100 is restarted with the std firmware 311 and the safe firmware 301 is updated. However, the present invention is not limited to this, and a method in which the safe firmware 301 is updated first can be applied.

As shown in processing step 501 in FIG. 3A, the information processing apparatus 100 is first activated with the safe firmware 301 in step S101. Then as shown in processing step 401 of FIG. 3A, in step S102 the CPU 210 downloads a piece of update target firmware from the external server 250. In step S103, the CPU 210 determines whether or not the download failed. In the case in which the download failed, the procedure moves to step S104, otherwise the procedure moves to step S106.

In step S104, the CPU 210 determines whether or not the error is a first-time error. In the case of a first-time error, the procedure moves to step S105, otherwise the procedure moves to step S120. In step S105, the CPU 210 executes retry processing, i.e., re-download processing, and the procedure returns to step S102. In the case in which in step S104, the error is an error that has occurred twice (or more), the procedure moves to step S120, it is determined that an error that cannot be resolved with retry processing occurred, and the information processing apparatus 100 is activated with the std firmware 311. In other words, here, the firmware is switched from the safe firmware 301 to the std firmware 311, and the information processing apparatus 100 is activated. Accordingly, in the following processes, the information processing apparatus 100 is activated with the std firmware 311, and therefore the safe firmware 301 becomes the update target firmware.

On the other hand, in the case in which it was determined in step S103 that an error did not occur, the procedure moves to step S106, and as shown in processing step 402 of FIG. 3A, the CPU 210 performs processing to back up the former std firmware 311 and render the downloaded firmware. Next, in step S107 the CPU 210 determines whether or not an error occurred in backup processing or rendering processing. In the case in which an error occurred, the procedure moves to step S108, otherwise the procedure moves to step S110. In step S108, the CPU 210 determines whether or not the error is a first-time error. In the case in which the error is a first-time error, the procedure moves to step S109, and the CPU 210 executes retry processing, i.e., backup processing or rendering processing again, and the procedure returns to step S106. In the case in which it was determined in step S108 that the error is an error that has occurred twice (or more), the procedure moves to step S120, and activation is performed with the std firmware 311.

However, in the case in which it is determined in step S107 that an error did not occur the procedure moves to step S110, and the CPU 210 executes updating of the std firmware 311. In step S111, the CPU 210 determines whether or not an error occurred in update processing. In the case in which an error occurred, the procedure moves to step S112, otherwise the procedure moves to step S118. In step S112, the CPU 210 determines whether or not the error is a first-time error. In the case in which the error is a first-time error, the procedure moves to step S113, retry processing, i.e., update processing is executed again, and the procedure returns to step S110.

In the case in which in step S112, the error is an error that has occurred twice (or more), the procedure moves to step S118, and the CPU 210 executes processing to write-back the former std firmware 311. Thereafter, the procedure moves to step S119, and it is determined whether or not the write back was successful. In the case in which write-back processing was successful, the procedure moves to step S120, and the CPU 210 activates the information processing apparatus 100 with the std firmware 311. In the case in which the write back processing failed, the procedure moves to a processing D shown in FIG. 5B-2.

However, in the case in which it was determined in step S111 that an error did not occur, the procedure moves to step S114, and the CPU 210 moves to processing for updating various types of engine firmware, such as the printer engine firmware 231 and the scanner engine firmware 232 in FIG. 1. In step S115, the CPU 210 determines whether or not an error occurred in update processing, and if an error occurred the procedure moves to step S116, otherwise the procedure moves to step S118.

In step S116, the CPU 210 determines whether or not the error is a first-time error. In the case in which the error is a first-time error, the procedure moves to step S117, and the CPU 210 executes retry processing, i.e., update processing is performed again, and the procedure returns to step S114. In the case in which in step S116, the error is an error that has occurred twice (or more), the procedure moves to step S118, and the CPU 210 executes processing to write back the former std firmware 311. This is because since the std firmware 311 was updated in advance in step S110, in the case in which updating to new engine firmware is not performed, the combination of the std firmware 311 and the engine firmware can no longer be guaranteed.

Thereafter, the procedure moves to step S119, and the CPU 210 determines whether or not the write back was successful. In the case in which the write back processing was successful, the procedure moves to step S120, and the CPU 210 activates the information processing apparatus 100 with the std firmware 311. However, in the case in which the write back processing failed, the procedure moves to the processing D shown in FIG. 5B-2.

Figures 1, 5B:
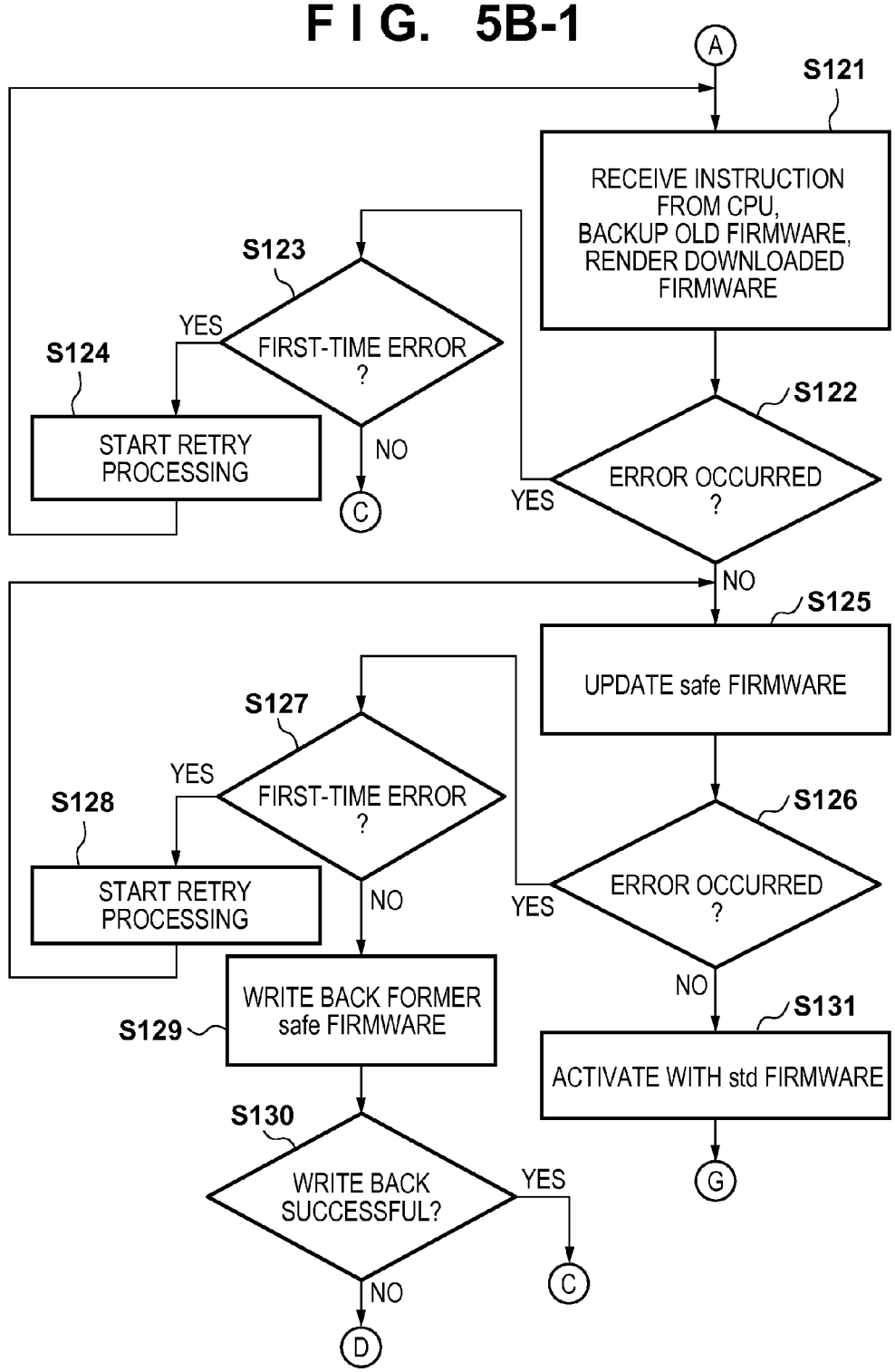

Also, in the case in which it was determined in step S115 that an error has not occurred, the procedure moves to S120, and the CPU 210 activates the information processing apparatus 100 with the std firmware 311, and the procedure moves to a processing A shown in FIG. 5B-1.

Next, the flowchart in FIGS. 5B-1 and 5B-2 will be described. The processing that has transitioned from the processing A in FIG. 5A-2 proceeds to step S121, and as shown in processing step 406 of FIG. 3A, the CPU 210 executes processing to backup the former safe firmware 301 and render the downloaded firmware. Next, in step S122, the CPU 210 determines whether or not an error occurred in backup processing or rendering processing. In the case in which an error has occurred, the procedure moves to step S123, otherwise the procedure moves to step S125.

In step S123, the CPU 210 determines whether or not the error is a first-time error. In the case in which the error is a first-time error, the procedure moves to step S124, and the CPU 210 executes retry processing, i.e., backup processing or rendering processing is performed again, and the procedure returns to step S121. In the case in which in step S123, the error is an error that has occurred twice (or more), the procedure moves to a processing C.

In the case in which it was determined in step S122 that an error did not occur, the procedure moves to step S125, and the CPU 210 executes processing to update the safe firmware 301. In step S126, the CPU 210 determines whether or not an error occurred in update processing. The procedure moves to step S127 in the case in which an error has occurred, otherwise the procedure moves to step S131.

In step S127, the CPU 210 determines whether or not the error is a first-time error. In the case in which the error is a first-time error, the procedure moves to step S128, the CPU 210 executes retry processing, i.e., update processing is performed again, and the procedure returns to step S125. In the case in which in step S127, the error is an error that has occurred twice (or more), processing is executed in step S129 to write back the former safe firmware 301. Thereafter, the procedure moves to step S130, and the CPU 210 determines whether or not the write back was successful. In the case in which the write back processing was successful, the procedure moves to the processing C, and in the case in which the processing failed, the procedure moves to the processing D.

In the case in which it is determined in step S126 that an error has not occurred, the procedure moves to step S131, and the CPU 210 activates the information processing apparatus 100 with the safe firmware 301. Then, the procedure moves to step S132, and the CPU 210 executes processing to update the std firmware 311. In step S133, the CPU 210 determines whether or not an error occurred in the update processing. In the case in which it is determined that an error has occurred, the procedure moves to step S134, otherwise the procedure moves to step S136.

In step S134, the CPU 210 determines whether or not the error is a first-time error. In the case in which the error is a first-time error, the procedure moves to step S135, and the CPU 210 executes retry processing, i.e., update processing is performed again, and the procedure returns to step S132. In the case in which in step S134, the error is an error that has occurred twice (or more), the procedure moves to step S140, and the CPU 210 executes processing to write back the former std firmware 311. Thereafter, the procedure moves to step S141, and the CPU 210 determines whether or not the write back was successful. In the case in which the write back processing was successful, the procedure moves to the processing C, and in the case in which the processing failed, the procedure moves to the processing D.

In the case in which it is determined in step S133 that an error has not occurred, the procedure moves to step S136, and the CPU 210 executes processing for updating various types of engine firmware, such as, the printer engine firmware 231 and the scanner engine firmware 232 in FIG. 1. In step S137, the CPU 210 determines whether or not an error occurred in update processing. In the case in which an error has occurred, the procedure moves to step S138, otherwise the procedure moves to step S142.

In step S138, the CPU 210 determines whether or not the error is a first-time error. In the case in which the error is a first-time error the procedure moves to step S139, retry processing is executed, i.e., update processing is performed again, and the procedure returns to step S136. In the case in which in step S138, the error is an error that has occurred twice (or more), the procedure moves to step S140, and the CPU 210 executes processing to write back the former std firmware 311. This is because since the std firmware 311 was updated in step S132, in the case in which updating to new engine firmware is not performed, the combination of the std firmware 311 and the engine firmware can no longer be guaranteed.

Thereafter, the procedure moves to step S141, and the CPU 210 determines whether or not the write back was successful. In the case in which the write back processing was successful, the procedure moves to the processing C, and in the case in which the processing failed, the procedure moves to the processing D. In step S143, the processing C includes the CPU 210 displaying an error message, such as the one shown in 601 of FIG. 4, on the operation unit 220, the procedure moves to step S142, normal activation is performed with the std firmware 311, and the processing ends. In step S144, the processing D includes the CPU 210 displaying an error code, such as the one shown in 602 of FIG. 4, on the operation unit 220, and the processing ends. In the case in which the update did not fail in step S137, all update processes are completed, and in step S142 the CPU 210 normally activates the information processing apparatus 100 with the std firmware 311, and the processing ends.

As described above, according to the information processing apparatus of to the present embodiment, the activation mode is switched even in the case in which some sort of error occurred during updating, and, for example, update firmware (safe firmware) is updated first. Accordingly, errors are avoided, and the desired update processing can be performed. In other words, as shown in FIGS. 3A and 3B, the information processing apparatus according to the present embodiment includes std firmware that is used when normal activation is performed, and safe firmware that is used when firmware is updated. With this configuration, in the case in which two pieces of firmware are to be updated, the present information processing apparatus updates one of the pieces of firmware first, and if an error occurs during updating, the retry processing is executed, and in the case in which the error remains unavoidable, reactivation is performed with a piece of firmware that is different from the currently activated firmware. In other words, firmware that is different from the firmware used for reactivation is updated first. Thereafter, in the case in which this firmware can be normally updated, updating of the firmware in which an error occurred is executed again. By performing control in this way, this information processing apparatus can update the other firmware, while also avoiding an error that occurred, and furthermore there are cases in which two pieces of firmware can be updated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179517 filed on Sep. 3, 2014, which is hereby incorporated by reference herein in its entirety.

What is claimed is:

1. An information processing apparatus including a plurality of pieces of firmware, comprising:
a memory device configured to store the firmware including control firmware which controls an operation of the information processing apparatus and an updating program which executes an update process to update the control firmware;
an activation unit configured to activate the information processing apparatus using the updating program;
an update unit configured to update the control firmware which is different from the updating program, wherein the updating program is executed to control the activation unit to activate the information processing apparatus; and
a control unit configured to, if a failure occurs while the control firmware is being updated, cause the activation unit to restart the information processing apparatus using the control firmware which is different from the updating program that has controlled a previous activation, and cause the update unit to update the updating program which is different from the control firmware controlling the restarting.

2. The information processing apparatus according to claim 1, wherein if updating of the control firmware by the update unit ends normally, the control unit causes the activation unit to restart the information processing apparatus using the updated control firmware, and causes the update unit to update the updating program that is different from the updated control firmware.

3. The information processing apparatus according to claim 1, further comprising a retry unit configured to retry processing that was performed when the failure occurred.

4. The information processing apparatus according to claim 3, wherein if the number of retries by the retry unit exceeds a predetermined number of times, the control unit determines that an error occurred, and switches a piece of update target firmware.

5. The information processing apparatus according to claim 1, further comprising a reception unit configured to receive an update target control firmware from the outside.

6. The information processing apparatus according to claim 5, further comprising a detection unit configured to detect a failure that occurs while a control firmware is being updated,
wherein the detection unit detects at least one of a failure that occurs while the update target control firmware is being received by the reception unit, a failure that occurs when the update target control firmware received by the reception unit is rendered to a memory, a failure that occurs when a current control firmware of the information processing apparatus that corresponds to the update target control firmware is backed up, and a failure that occurs when a control firmware is updated by the update unit.

7. The information processing apparatus according to claim 6, wherein if the detection unit detects that a failure occurred when a control firmware is updated by the update unit, the control unit writes back a backed-up control firmware, and thereafter switches an update target control firmware.

8. The information processing apparatus according to claim 7, wherein when the backed-up control firmware is written back, the control unit displays, on an operation unit, that an original control firmware was returned to because a failure occurred.

9. The information processing apparatus according to claim 8, wherein if a failure occurs when the backed-up control firmware is written back, the control unit displays a failure code indicating an activation failure on the operation unit.

10. A method of controlling an information processing apparatus that includes a plurality of pieces of firmware and comprises a memory device configured to store the firmware including control firmware which controls an operation of the information processing apparatus and an updating program which executes an update process to update the control firmware, the method comprising:

activating the information processing apparatus using the updating program;

updating the control firmware which is different from the updating program, wherein the updating program is executed to control to activate the information processing apparatus in the activating step; and restarting, if a failure occurs while the control firmware is being updated, the information processing apparatus in the activating step using the control firmware which is different from the updating program that has controlled a previous activation, and updating the updating program which is different from the control firmware controlling the restarting.

11. A non-transitory computer-readable storage medium storing a computer program for causing a computer to execute each step in a method for controlling an information processing apparatus that includes a plurality of pieces of firmware and comprises a memory device configured to store the firmware including control firmware which controls an operation of the information processing apparatus and an updating program which executes an update process to update the control firmware, the method comprising:

activating the information processing apparatus using the updating program;

updating the control firmware which is different from the updating program, wherein the updating program is executed to control to activate the information processing apparatus in the activating step; and restarting, if a failure occurs while the control firmware is being updated, the information processing apparatus in the activating step using the control firmware which is different from the updating program that has controlled a previous activation, and updating the updating program which is different form the control firmware controlling the restarting.

* * * * *